United States Patent [19]

Tanis

[11] Patent Number: 4,926,106
[45] Date of Patent: May 15, 1990

[54] AIRCRAFT BATTERY CHARGING DEVICE

[76] Inventor: Peter G. Tanis, P.O. Box 117, Glenwood, Minn. 56334

[21] Appl. No.: 230,300

[22] Filed: Aug. 9, 1988

Related U.S. Application Data

[63] Continuation-in-part of Ser. No. 888,766, Jul. 22, 1986, Pat. No. 4,762,978.

[51] Int. Cl.$^5$ ............................ H02J 7/04; H05B 3/36
[52] U.S. Cl. .......................................... 320/35; 320/2; 219/202
[58] Field of Search .................. 219/209, 202; 320/35, 320/36, 2, 39; 361/99

[56] References Cited

U.S. PATENT DOCUMENTS

| 4,025,861 | 5/1977 | Godard et al. | 320/35 X |
| 4,081,737 | 3/1978 | Miyahara | 320/2 |
| 4,644,247 | 2/1987 | Burmenko | 320/39 |
| 4,762,978 | 8/1988 | Tanis | 219/209 X |

OTHER PUBLICATIONS

*Electronics—Designer's Casebook*, "Regulated Power Supply is Adjustable from 0 to 38V", Miles, McGraw Hill Pub. 8/1976, pp. 88, 89.

*Primary Examiner*—R. J. Hickey
*Attorney, Agent, or Firm*—Burd, Bartz & Gutenkauf

[57] ABSTRACT

A battery charging device is operable in conjunction with a battery heater to simultaneously heat and recharge the battery of an aircraft which has been stored under cold weather conditions. A thermostat energizes a power supply when the ambient air temperature drops below a given value. A transformer is connected with a power supply to produce an output voltage and a pair of transistors are connected with the transformer for converting the transformer output voltage to a given charging voltage which is supplied to the battery. A voltage control device including a rheostat and a voltage regulator is connected in a feedback circuit with the first and second transistors to control the transistors to produce a constant charging voltage. Thus as the battery is heated, the charging voltage supplied to the battery recharges the battery to full capacity.

14 Claims, 4 Drawing Sheets

AIRCRAFT BATTERY CHARGING DEVICE

This application is a continuation-in-part of application Ser. No. 888,766 filed July 22, 1986, now U.S. Pat. No. 4,762,978.

BACKGROUND OF THE INVENTION

Batteries provide their rated power at 77° F. At this temperature, the battery delivers proper power, and upon discharge, the battery will accept a charge from a charging source. At temperatures lower than 77° F, the viscosity of the electrolyte increases, thereby lowering the discharge capacity. This lowering of capacity occurs rapidly at temperatures below 32° F. Another problem which occurs at temperatures below 77° F is that a battery will not recharge properly. The battery, when charged with a constant voltage, will appear to recharge (i.e. it will come up to the rated voltage) but will not accept very much energy from the charging source. This is called a "surface charge". After two or three discharge—recharge cycles, the battery will be almost completely discharged of energy and will not be able to accept significant recharging.

In aircraft, this becomes critical due to the small capacity of the battery which is limited by weight considerations and due to the fact that many systems depend on electrical power. Sometimes the battery is discharged by a balked start or by a mistake such as leaving the master switch on. In this case, the battery will be destroyed by freezing if it cannot be recharged. Aircraft differ from automobiles in this respect because the battery is usually installed in a location other than the engine compartment and does not benefit from the heat generated by the engine.

BRIEF DESCRIPTION OF THE PRIOR ART

Often when attempting to start an aircraft in cold weather, an auxiliary battery or a ground power cart is connected in parallel with the aircraft battery to avoid discharging the battery.

Sometimes, a battery charger such as is used in automobiles is connected to an aircraft either while in storage or while attempting to start the aircraft. This charger operates by increasing the voltage above the system voltage in order to get the battery to accept a charge. The colder the temperature, the higher the voltage must be. Electronic systems on board the aircraft are often damaged by voltages higher than they are designed to take. Furthermore, the high voltages may destroy an aircraft battery by causing more current flow than they are designed to accept, since most are limited to 5 amps on recharge.

It is also conventional to attempt to warm the battery prior to starting by blowing hot air on the battery box with a device similar to a hair drier or by placing a light bulb adjacent the battery. These heating methods occasionally result in the aircraft catching on fire.

Also known in the art are aircraft recharging systems that increase the charging voltage in cold weather once the engine has been started. These attempts to get the battery to accept a charge have been only minimally successful. Such attempts can not increase the voltage above the system voltage as much as an automotive battery charge does because of the limits in voltage tolerance of the on board systems.

The present invention was developed in order to overcome these and other drawbacks of the prior art by providing an aircraft battery charger which operates with a battery heater to recharge an aircraft battery in order to bring the battery up to full charge.

SUMMARY OF THE INVENTION

Accordingly, it is a primary object of the present invention to provide a device for charging an aircraft battery while the battery is being heated including an AC power supply and step-down transformer connected with the power supply to produce an output voltage. First and second transistors are connected with the transformer for converting the transformer output voltage to a given charging voltage which is supplied to the battery. A voltage control device including a rheostat and a voltage regulator is connected with the output of the second transistor to control the transistors to produce a constant charging voltage, whereby as the battery is heated, the charging voltage supplied to the battery recharges the battery to full capacity.

According to a more particular object of the invention, the rheostat produces a reference voltage proportional to the voltage of the second transistor and the voltage regulator is connected with the rheostat to control the first transistor in accordance with the reference voltage. The first transistor produces an amplified output used to control the second transistor in order to produce the constant charging voltage supplied to the battery.

According to yet another object of the invention, a full wave rectifier is connected with the output of the transformer to convert the AC voltage from the power supply to a DC voltage. A filter capacitor is connected between the output of the rectifier and ground to remove variations from the DC voltage output of the rectifier. A second filter capacitor is also provided and is connected between the input of the integrated circuit and ground to remove additional variations from the output voltage from the rectifier. Finally, a third filter capacitor and a resistor both connected between the output of the second transistor and ground are also provided to filter out variations from the charging voltage.

In accordance with another object of the invention, a thermostat is provided for energizing the power supply when the ambient temperature drops below a given temperature. A relay connects the output of the second transistor with the positive terminal of the battery being charged when the power supply is energized, thereby to supply the charging voltage to the battery.

According to yet another object of the invention, the battery charging device is incorporated with a battery heating device which is also connected with the power supply and the thermostat, whereby when the ambient temperature drops below a given value, the power supply simultaneously energizes both the battery heater and the battery charging apparatus to simultaneously heat and charge the battery.

In accordance with a more specific object of the invention, the battery heater includes a sheet-like rectangular jacket with a height just less than that of the battery and a length approximately equal to the battery circumference to surround the sides of the battery. The vertical edges of the jacket have eyelets which are laced together to hold the jacket in contact with the battery. The jacket and battery are placed in the battery box with a power lead extending from the jacket to outside of the box. The jacket is made of inner and outer layers of insulative material with a flexible heating element between them. A wiring harness has a lead connected to the jacket and another connected to the power source. Another lead is connected to a thermostat to turn power on and off to the jacket. The thermostat closes when it senses a predetermined low temperature. In one form of the invention, the thermostat is installed on the aircraft skin and senses ambient temperature. In another form of the invention, the thermostat is placed in proximity to the battery top to sense the temperature there.

BRIEF DESCRIPTION OF THE FIGURES

Other objects and advantages of the subject invention will become apparent from a study of the following specification when viewed in the light of the accompanying drawing, in which.

DETAILED DESCRIPTION

Figure 1:
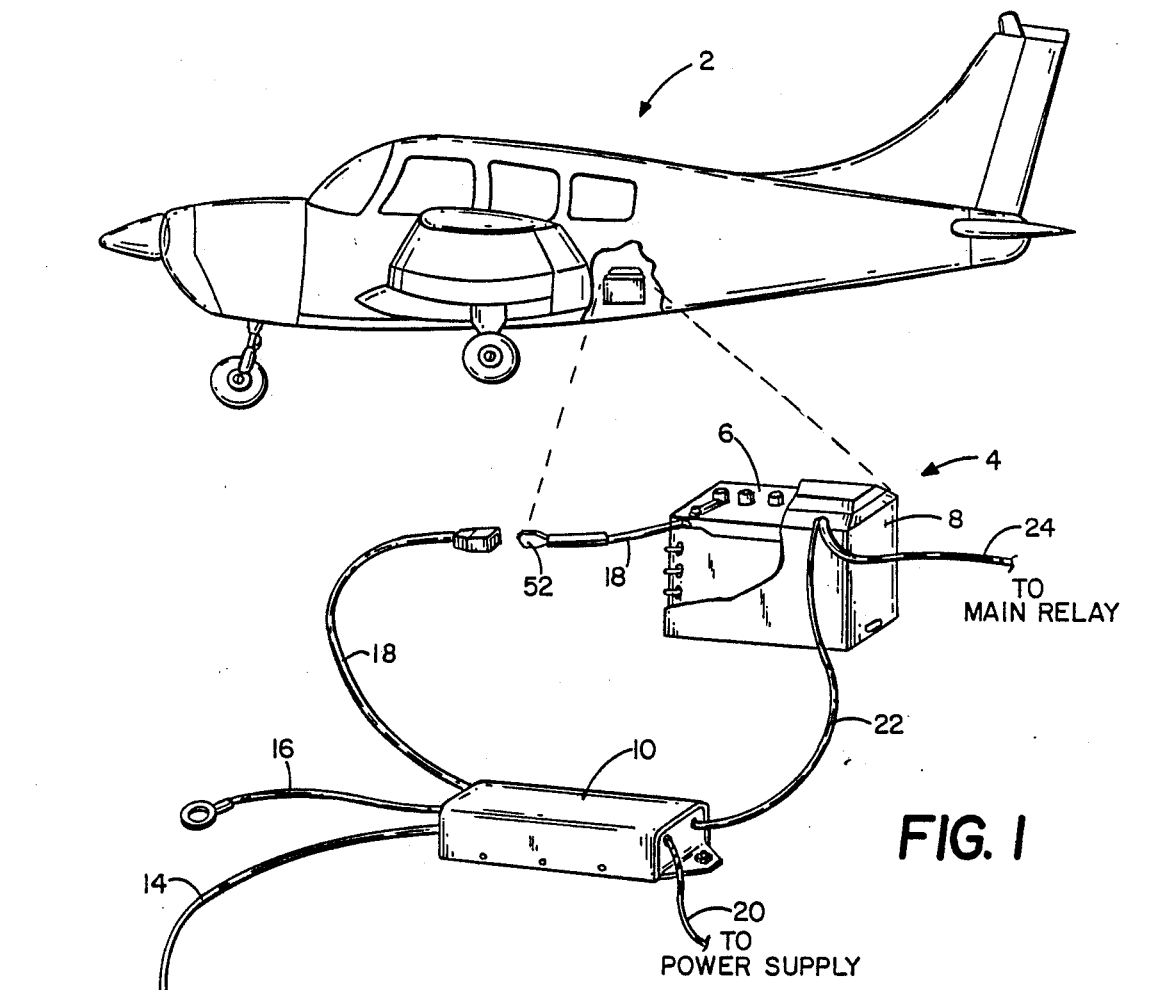
FIG. 1 is a side elevational view of a single-engine private aircraft with a portion broken away to show the battery location and illustrating the battery charging and heating assembly of the invention, in exploded view, apart from the aircraft.
Figure 2:
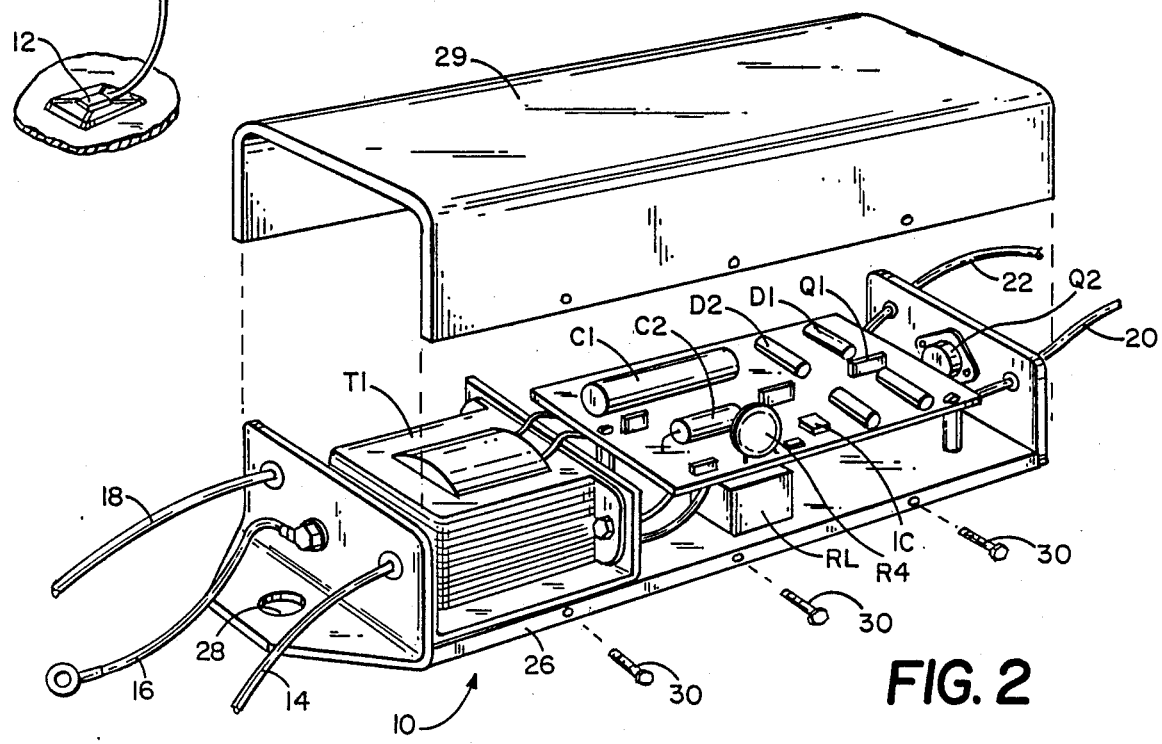
FIG. 2 is an exploded perspective view of the battery charging device according to the invention.

Referring first to FIG. 1, there is shown a private single-engine aircraft 2 within which an aircraft battery assembly 4 is to be mounted. The battery assembly includes a lead cell battery 6 surrounded by a heating jacket 8 as will be developed in greater detail below. The battery assembly is typically mounted in the aircraft in the location shown. Connected with the battery assembly 4 is a heater/charger module 10 which is preferably mounted to the frame of the aircraft adjacent the battery assembly 4. A thermostat 12 is mounted on the skin of the aircraft for sensing the ambient air temperature. The thermostat is connected via a cable 14 with the module 10. A ground wire 16 is also connected with the module for grounding the same. A heater cable 18 is connected with the heater/charger module 10 and with the heating element of the heating jacket 8. Cable 20 from the module 10 is connected with a power supply, and cable 22 is connected between module 10 and the positive terminal of the battery 6. A lead 24 from the battery 6 is connected with a main relay (not shown) and is used to start the engine of the aircraft Referring now to FIG. 2, the charger/heater module is shown in more detail. The module includes a base 26 containing a pair of openings 28 (of which only one is shown) for connecting the module with the frame of the aircraft by any suitable means such as bolts, screws and the like. The module base supports electrical components defining the battery charger circuitry which will be described in more detail below with reference to FIG. 3. A cover 29 is provided to protect the components of the module, the cover being connected with the base by any suitable means such as screws 30.

Figure 3:
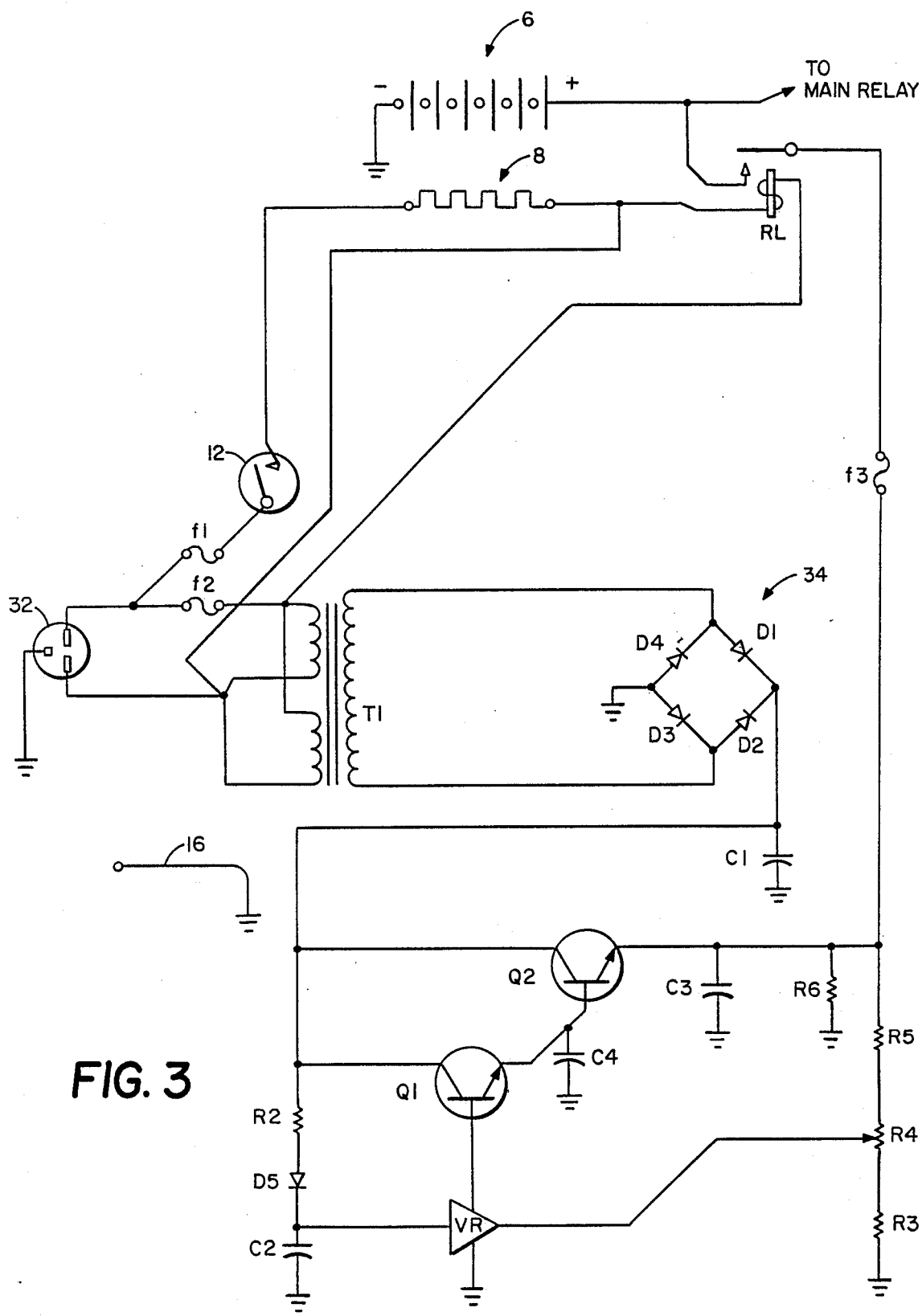
FIG. 3 is an electrical circuit diagram illustrating the battery charging and heating device according to the present invention.

Referring now to FIG. 3, the battery charging and heating device according to the invention is illustrated in circuit diagram form. The battery 6 includes positive and negative terminals, the positive terminal being connected with the main relay and with the battery charging circuit. Arranged adjacent the battery 6 is the heater of the heating jacket 8, the heating element preferably comprising a resistance element energized by a power supply 32 when the ambient temperature sensed by the thermostat 12 falls below a given value. A fuse fl is provided between the thermostat and the power supply.

The power supply 32 is typically a 115 volt AC power supply. Connected with the power supply 32 via fuse f2 is a step-down transformer T1 which produces approximately 30 volts AC at its output terminals. For 28 volt systems, the transformer could be adapted to produce 60 volts AC. Also connected with the power supply is a relay RL which closes upon energization of the power supply to connect the battery with the output of the charging circuit. Connected with the secondary winding of the transformer T1 is a full wave rectifier 34 comprising a diode bridge including diodes D1, D2, D3, and D4. The rectifier converts the 30 volt AC output from the transformer T1 into a 30 volt DC output which is delivered to a pair of transistors Q1 and Q2. A first filter capacitor C1 is connected between the output of the full wave rectifier and ground to remove ripples or variations from the 30 volt DC output. The filtered 30 volt DC output is supplied to the transistors Q1, Q2 and to a voltage reducing circuit including resistor R2 and diode D5. Upon passing through resistor R2 and diode D5, the voltage is dropped in value to a lower voltage which is used to operate a voltage regulator VR. Any variations in voltage which occur after the voltage drop are passed to ground by filter capacitor C2.

The transistors Q1, Q2 produce an output charging voltage which is used to charge the battery. This charging voltage is controlled by a feedback voltage control circuit. More particularly, a reference voltage which is proportional to the output voltage of the second transistor Q2 allows a variable setting for the output voltage 02. The voltage regulator senses the reference voltage at the rheostat R4 and controls the first transistor Q1 which amplifies its output to control the second transistor Q2. The charging voltage of Q2 is controlled at the predetermined value necessary to provide a safe charge of battery at 77° F. In most cases this will be about 14.2 volts DC (and for 28 volt systems, would be about 28.4 volts DC).

In order that the rheostat provide the proper reference voltage to the voltage regulator VR, resistors R3 and R5 are provided on opposite sides of the rheostat and define a voltage divider for dividing the output voltage from the second transistor Q2. The output voltage of Q2 is thus controlled via the feedback circuit comprising the rheostat R4 and the integrated circuit IC together with the first transistor Q1. The controlled output voltage of transistor Q2 then proceeds past a condenser C3 and resistor R6, both of which are connected to ground and which work together to filter out any additional ripples or variations produced in the output voltage. As a result of this filtering and the prior filtering of the capacitors C1 and C2, the charging voltage has less than 2% variation. The charging voltage then passes through fuse f3 and through the closed contacts of the relay RL to the positive terminal of the battery 6.

As shown in FIG. 1, the battery 6 has a normal rectangular box like configuration. The battery heater includes an elongate jacket 8 configured to be wrapped around the sides of the battery 6. Jacket 8 has a height less than that of battery and a length to be almost wrapped around the battery. Vertical edges 33, 34 of jacket 8 are equipped with a plurality of vertically aligned grommets 36, 38 respectively. When the jacket 8 is wrapped circumferentially around the battery 6, the edges 33, 34 are located proximate one corner of the battery 6. Lacing 40 is passed through the respective grommets or eyelets 36, 38 of edges 33, 34 to fasten the jacket 8 to the battery 6. Lacing 40 can be comprised of one continuous lace or of individual laces passing through corresponding grommets on the edges 33, 34 of jacket 8.

Figure 10:
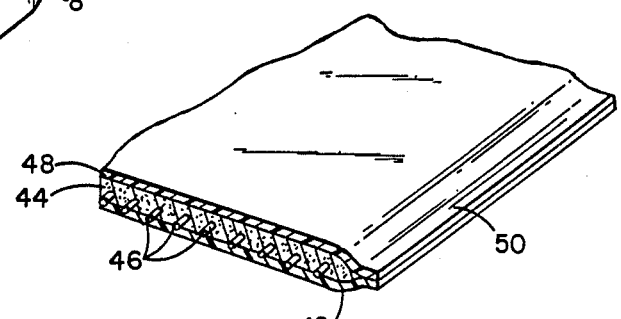
FIG. 10 is an enlarged sectional view of a portion of the heating jacket of FIG. 4A taken along the line 10—10 thereof.

Jacket 8 is comprised of an electrically activated, flexible heating element embedded in protective layers of suitable flexible, insulative material and comprised of a thickness small enough to wrap around battery corners without damage and fit within a battery box housing when wrapped around battery 6. An example of the jacket structure is shown in FIG. 10, although equivalent structure could be used. Jacket 8 includes a first or inner layer 42 of suitable insulative material, such as silicone rubber impregnated glass fiber fabric. A second or middle layer 44 comprises an electrical heating element constituted as a nichrome wire grid 46 embedded in silicone rubber. A third or outer layer 48 is constituted as another layer of silicone rubber, impregnated glass fiber fabric. At the edge of jacket 8, the first and third or inner and outer layers 42, 48 are heat-sealed, bonded, or otherwise suitably joined, as shown at edge 50 in FIG. 10 to protect and isolate the middle layer 44. The first, second and third layers together can comprise the thickness of approximately 0.075 inches (0.190 cm), whereby jacket 8 is readily wrapped around battery 6 without damage at the corners and occupying minimal space.

Jacket 8 is conveniently constructed by laying out the proper length of the first layer of uncured silicone, impregnated glass fiber cloth. The nichrome wire grid is laid out on the first layer. The third layer of uncured silicone, impregnated glass fiber cloth is laid over the nichrome wire grid. The composite is placed in a heated mold under a pressure of 30 to 50 pounds per square inch and heated to 325 degrees F for 15 minutes to cure the silicone.

A jacket power lead 18 is bonded into the composite structure connected to the nichrome wire grid at the time the jacket is cured in the heated mold. When the battery and jacket are installed in the housing of the battery box, the power lead 18 exits through a suitably provided opening and has an end plug 52 for connection to a wiring harness, as will be described, for connection to an external power source, typically a 110 volt AC circuit, via the heater charger module 10.

Figure 4:
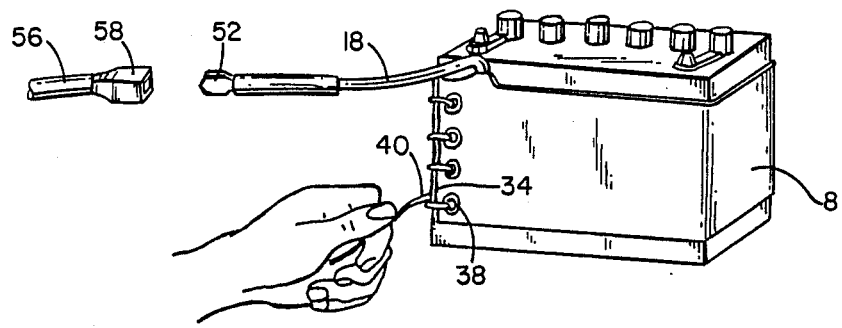
FIG. 4 is an enlarged view of the battery assembly of FIG. 1 without the battery case and showing installation of the heater jacket on the battery.
Figure 4A:
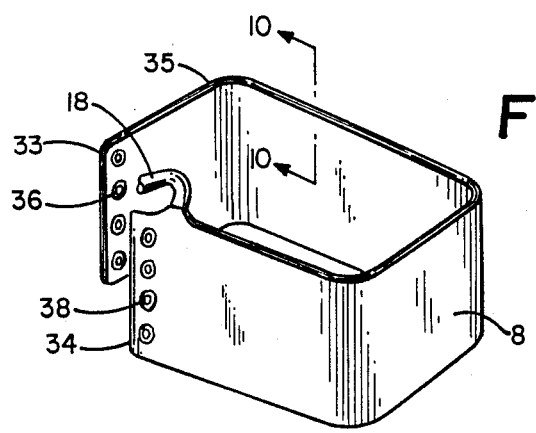
FIG. 4A is a view in perspective of the heater jacket of the battery assembly in FIG. 4.
Figure 5:
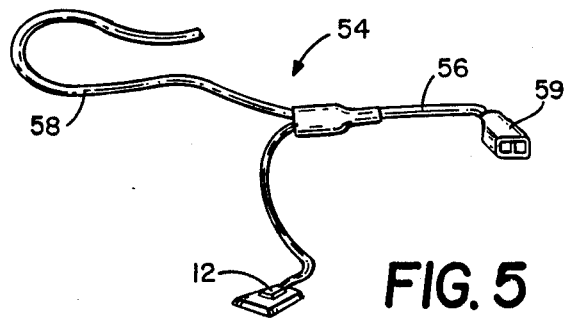
FIG. 5 is a perspective view of the wiring harness of the battery assembly.
Figure 6:
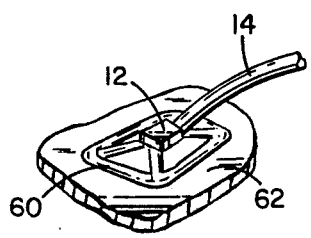
FIG. 6 is a perspective view of one form of thermostatic switch according to the invention.
Figure 7:
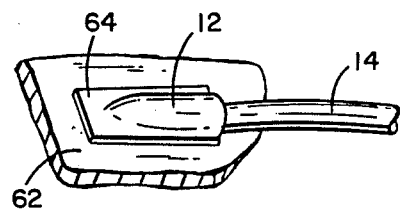
FIG. 7 is a perspective view of another form of a thermostatic switch for the battery assembly of the invention.

When the charging circuit and module 10 are not being used, power to jacket 8 is thermostatically controlled and supplied through a wiring harness 54, shown in FIG. 5. A second power lead 56 has a plug 59 for connection to the plug 52 of the jacket power lead 18 (FIG. 4). The second power lead 56 is connected to a main power lead 58, which extends to the remote power source (not shown). A thermostat lead 14 is connected to a thermostat 12 at one end. The opposite end of the lead 14 is connected between the main power lead 58 and the second power lead 56, whereby thermostat 12 controls the flow of electricity from the remote power source to the jacket 8. The thermostat 12 is operative to energize the power connection between the remote power source and jacket 8 when the temperature sensed by it drops to a predetermined value, such as freezing. Thermostat 12 is placed in a position whereby it will sense ambient temperature. In the configuration shown in FIGS. 5 and 6, thermostat 12 is connected to a mounting plate 60. Mounting plate 60 is glued or riveted or otherwise joined to the interior of the surface skin of the aircraft. When the temperature sensed by the thermostat 12 reaches freezing, the thermostat closes the circuit between the main power lead 58 and the second power lead 56 to energize the jacket 8 to provide heat to the battery 6 by conduction through the sides of the battery. FIG. 7 shows an alternative method of mounting the thermostat 12 to the skin 62 of the aircraft, impregnated fiber glass sheath 64, which is bonded to the aircraft skin 62.

Figure 8:
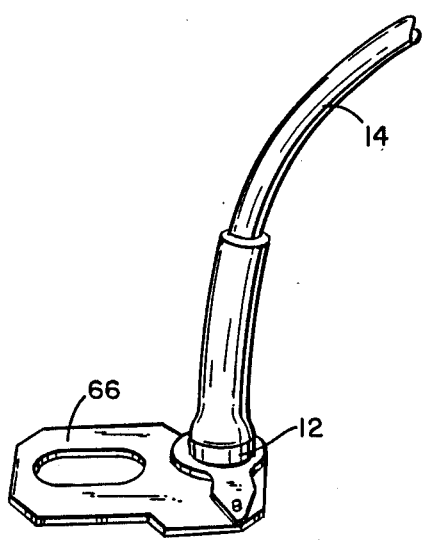
FIG. 8 shows a third form of thermostatic switch for connection to the battery.
Figure 9:
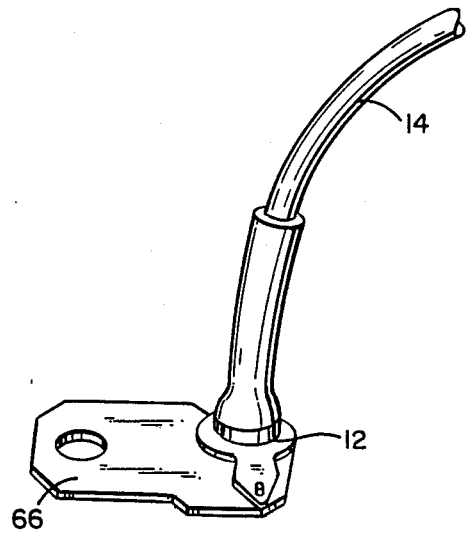
FIG. 9 is a fourth form of thermostatic switch for connection to the ground post on a battery.

An alternative method of temperature control is a thermostat secured proximate the battery. In FIG. 8, there is shown the thermostat lead 14 having the thermostat 12 secured to a clamp 66 adapted to be secured to the vent cap of the aircraft battery. In FIG. 9, there is shown a thermostat power lead 14 connected to a thermostat 12, connected to a clamp 68, adapted to be fixed to the ground post of the aircraft battery. In these two instances, the thermostat senses the temperature at the top of the battery case.

Heating element 46 is constituted to provide the correct amount of heat to battery 6 according to the size of battery. The surface temperature of jacket 8 is limited in the event that it becomes detached from the battery in order to avoid melting of the plastic battery cases or doing other damage. This is accomplished by limiting the watt density of heating element 46 to 0.5 watts per square inch of heated area. In addition, the total wattage of the heating element 46 is preferably matched to the size of the battery to be heated so that in the event of thermostat failure, the battery will not be damaged by overheating. A total wattage in the range of 0.9 to 2.0 watts per pound of battery is a safe range.

In use, the battery assembly is installed in the aircraft 2 and secured therein in the usual fashion in fuselage. The thermostat is connected to the aircraft skin. The jacket power lead 18 is connected to the second power lead 56 of the wiring harness 54, which is connected by main power lead 58 to a remote power source. When the thermostat 12 senses a reduction in temperature to a predetermined limit, such as freezing, it permits energization of the jacket 8 through the main power lead 58 and second power lead 56. The heating element 46 provides heat to the battery 6 through the sides thereof being snugly in contact thereof through the first layer 42. Jacket 8 is installed on the battery 6 by wrapping it around the sides of the battery, such that the edges 32, 34 approach one another proximate a corner of the battery. Lacing 40 is used to secure jacket 8 in place. If the jacket 8 is detached from the battery 6, the total heat generated will not be enough to cause significant damage to the battery box or other surrounding items. In the event of thermostat failure, the heat generated overall by the jacket 8 will not permanently damage the battery 6.

Alternatively to connecting the thermostat to the skin of the aircraft, it can be connected inside the battery box at the top of the battery to sense the temperature immediately proximate the battery.

In the operation with the charging circuit, the thermostat 12 senses an ambient temperature below a given temperature, such as 32° F, and the thermostat closes to connect the power supply to the battery heater 8 which is installed in the battery box of the aircraft. When power is applied to the heater, the relay RL closes to connect the battery positive terminal to the charger circuit. As the battery warms under the influence of heat from the resistance heater 8, its ability to accept a charge increases until it reaches its normal temperature 77° F. At this temperature, the constant voltage charge supplied to the battery recharges the battery to full capacity.

An optional safety device for the battery charging system of the present invention is to provide a second thermostat (not shown) connected to the battery case, vent plug, or ground terminal. This thermostat would interrupt power to both the charger and the heater if the battery temperature exceeds a predetermined value. In most cases this value would be on the order of 90° F, and the thermostat would keep the electrolyte of the battery from boiling away in the event of failure of the heater or charger control.

The present invention thus serves to maintain optimum performance of an aircraft battery during cold weather storage of the aircraft. This is due to the fact that while the airplane is stored, the battery charging circuit and battery heater may be plugged into a 115 volt AC power source and periodically energized, in accordance with the ambient temperature sensed by the thermostat to heat and recharge the battery. The heater brings the battery up to its optimum temperature for both discharging and recharging. Simultaneously, the recharging circuit of the invention is energized to apply a constant voltage to the battery terminals. This circuit is regulated and filtered to provide a constant voltage which can be set at a predetermined value and has less than 2% ripple. By the use of a constant regulated source, the electrical system of the aircraft is protected. Since the battery is maintained at approximately 77° F, the constant voltage charging system brings the battery up to full charge. The power output of the charging circuit is limited by the capacity of its components to about 3 amps at the charging voltage so as not to harm the battery by over charging. When the aircraft is started, the battery will give full power and will quickly recharge since it will be warm. Should the battery be run down without starting the engine, the heater/charging system of the invention will bring the battery up to full charge under control of the thermostat to energize the power supply.

While in accordance with the provisions of the patent statute the preferred forms and embodiments of the invention have been illustrated and described, it will be apparent to those of ordinary skill in the art that various changes may be made without deviating from the inventive concepts set forth above.

What is claimed is:

1. Apparatus for charging an aircraft battery, comprising
  (a) a power supply;
  (b) transformer means connected with said power supply for producing an output voltage;
  (c) transistor means including first and second transistors connected with said transformer means for converting said transformer output voltage to a given charging voltage which is supplied to the battery;
  (d) voltage control means connected with said first transistor for controlling said first transistor to produce an amplified output used to control said second transistor for producing a constant charging voltage, said voltage control means comprising a feedback circuit including
    (1) means for producing a reference voltage proportional to the output voltage of said second transistor; and
    (2) voltage regulator means connected with said reference voltage producing means for controlling said first transistor in accordance with said reference voltage;
  (e) a thermostat for sensing when the ambient temperature drops below a given value; and
  (f) a relay for connecting the output of said second transistor with the positive terminal of the battery, said relay being operated in response to operation of said thermostat, thereby to supply charging voltage to the battery.

2. Apparatus as defined in claim 14, and further comprising a mounting plate fixed to said thermostat, said mounting plate being secured to the side wall of the aircraft.

3. Apparatus as defined in claim 14, and further comprising a silicone rubber sheath encapsulating the thermostat, and means for securing said sheath to the side wall of the aircraft.

4. Apparatus as defined in claim 14, wherein said jacket provides a total wattage of between 0.9 and 2.0 watts per pound of battery.

5. Apparatus as defined in claim 14, wherein said thermostat is mounted proximate the top of the battery to sense ambient temperature immediately proximate the battery.

6. Apparatus for charging and heating an aircraft battery, comprising
  (a) a power supply;
  (b) transformer means connected with said power supply for producing an output voltage;
  (c) transistor means including first and second transistors connected with said transformer means for converting said transformer output voltage to a given charging voltage which is supplied to the battery;
  (d) voltage control means connected with said first transistor for controlling said first transistor to produce an amplified output used to control said second transistor for producing a constant charging voltage, said voltage control means comprising a feedback circuit including
    (1) means for producing a reference voltage proportional to the output voltage of said second transistor; and
    (2) voltage regulator means connected with said reference voltage producing means for controlling said first transistor in accordance with said reference voltage;

(e) heater means arranged adjacent the battery for heating the battery;

(f) a thermostat for connecting said heater means with said power supply, said thermostat energizing said heater means when the ambient temperature drops below a given value; and (g) a relay for connecting the output of said second transistor with the positive terminal of the battery, said relay being operated in response to operation of said thermostat, thereby to supply charging voltage to the battery simultaneously with heating of the battery.

7. Apparatus as defined in claim 6, wherein said reference voltage producing means comprises a rheostat.

8. Apparatus as defined in claim 4, and further comprising voltage divider means connected with said rheostat for dividing said second transistor output voltage, whereby said rheostat provides a proper reference voltage.

9. Apparatus as defined in claim 6, wherein said power supply comprises an AC power supply, and further comprising a full wave rectifier connected with the output of said transformer means for converting AC voltage to DC voltage.

10. Apparatus as defined in claim 9, wherein said transformer means comprises a step-down transformer.

11. Apparatus as defined in claim 10, wherein said voltage regulator means includes voltage reducing means connected with the input thereof, whereby output voltage from said rectifier means is used to power said voltage regulator means.

12. Apparatus as defined in claim 11, and further comprising filter means for filtering variation from said charging voltage.

13. Apparatus as defined in claim 9, wherein said filter means comprises
  (1) a first filter capacitor connected between the output of said rectifier means and ground;
  (2) a second filter capacitor connected between the input to said integrated circuit and ground; and
  (3) a third filter capacitor and a resistor both connected between the output of said second transistor and ground.

14. Apparatus as defined in claim 19, wherein said heater means comprises
  (1) a battery heater including an elongate, flat, generally rectangular jacket approximately 0.075" thick wrapped around the battery, having a width less than the height of the battery and a length approximately equal to the circumference of the battery, said jacket having first and second vertical edges having vertically aligned eyelets and lace means interconnecting the eyelets on the first and second edges of the jacket to secure the jacket to the battery;
  (2) said jacket comprised of inner and outer layers of silicon rubber impregnated glass fiber fabric and a flexible heating element of nichrome wire grid embedded in a layer of silicon rubber disposed between the inner and outer layers of flexible material, said nichrome wire grid providing a watt density of 0.5 w per square inch of jacket area; and
  (3) a heating jacket power lead extending from said heating jacket to said power supply.

* * * * *